Dec. 14, 1937. A. M. McLEOD 2,102,429

GREASE TRAP

Filed July 3, 1936

INVENTOR.
Arthur M. McLeod
BY Morsell, Lieber & Morsell
ATTORNEYS.

Patented Dec. 14, 1937

2,102,429

UNITED STATES PATENT OFFICE 2,102,429

GREASE TRAP

Arthur M. McLeod, Madison, Wis., assignor to D. J. Murray Manufacturing Co., Wausau, Wis., a corporation of Wisconsin Application July 3, 1936, Serial No. 88,729

8 Claims. (Cl. 210—56)

My present invention relates generally to improvements in the art of separating fluent substances having different specific gravity, and relates more specifically to improvements in the construction and operation of devices known generally as traps, for removing oily substances such as grease from various liquids such as water.

In general, an object of my present invention is to provide an improved grease trap or the like, which is simple and compact in construction and which is moreover highly efficient in operation.

It has heretofore been proposed to separate grease from water with the aid of a trap having a separating basin, and a dam at the inlet end of the basin over the crest of which the grease-laden mixture is permitted to flow, the separated grease accumulating at the top of the basin in advance of and beyond the dam while the separated liquid is withdrawn from the lower portion of the opposite end of the basin and is subsequently delivered through the outlet. Because of the fact that the specific gravity of grease so closely approaches that of water, it is undesirable to produce a turbulent flow of liquid through the trap, and with the relatively high solid type of dam formerly used, it has been found that the spilling of liquid over the dam and through the accumulated grease, tends to undesirably agitate the grease and causes the mixture to flow downwardly directly toward the outlet thereby preventing effective gravity separation of the constitutents and materially reducing the capacity of the trap as well as the efficiency thereof. It has also been discovered that the maximum rating of a grease trap depends largely upon maintenance of relatively low velocity of flow and substantially uniform distribution of the flow of mixture past the dam and through the separating chamber, and such relatively uniform distribution of flow should be maintained regardless of the quantity of grease accumulated at the top of the basin. The low velocity of flow should also preferably be maintained at all times without introducing violent turbulency or disturbances in the liquid basin beyond the dam, and the grease laden mixture should preferably be caused to flow upwardly toward the top of the separating basin while the separated liquid should preferably be gently withdrawn at a point remote from the grease deposits.

It is therefore a more specific object of the present invention to provide an improved device for separating grease and liquid, which will meet these desirable conditions and requirements, and which will therefore produce effective separation without materially affecting the rating as the grease accumulates.

Another specific object of my invention is to provide a new and useful trap assemblage for separating oily substances such as grease from liquid such as water, which assemblage occupies minimum space commensurate with its capacity, and all portions of which are conveniently accessible for inspection and removal of accumulated grease as well as for cleaning.

An additional specific object of the present invention is to provide an improved partition or dam for grease traps or the like, having by-pass passages and louvers for automatically regulating or controlling the flow of mixture to the separating chamber or basin, and for maintaining a desirably uniformly distributed and low velocity flow in the proper direction so as to insure most efficient separation.

Still another specific object of the invention is the provision of other improvements in the details of construction of grease traps for household or commercial purposes, which may be manufactured, installed and operated at minimum cost, and which are thoroughly reliable in operation.

These and other specific objects of the invention will be apparent from the following detailed description.

A clear conception of one embodiment of the present invention, and of the mode of constructing and of utilizing grease traps built in accordance with the improvement, may be had by referring to the drawing accompanying and forming a part of this specification wherein like reference characters designate the same or similar parts in the various views.

Figures 1, 2, 3, 4:
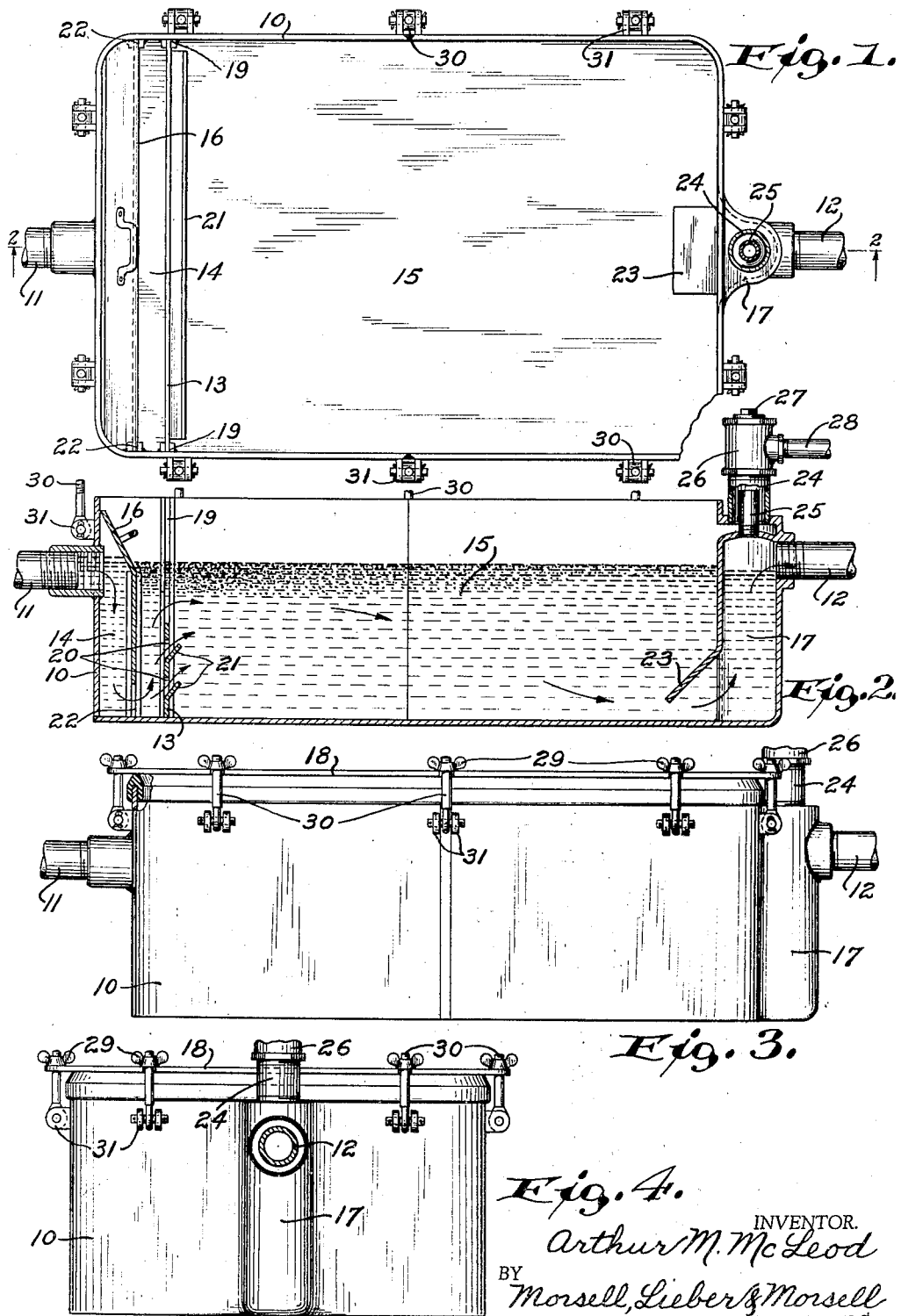
Fig. 1 is a top view of my improved grease trap, with the cover thereof removed in order to reveal internal structure.
Fig. 2 is a central vertical section through the grease trap of Fig. 1, taken along the line 2—2 of Fig. 1.
Fig. 3 is a side elevation of the improved grease trap.
Fig. 4 is an end view of the improved trap, both Figs. 3 and 4 showing the closure cover applied.

While the improvement has been shown and described as being specifically applied to a trap which is especially adapted to separate grease from water, and also specifically adapted for cooperation with a sink or the like, it is not the intent to thereby unnecessarily restrict the scope of the invention, since the trap may be applicable for other uses such as the separation of any buoyant or fluent substance from any liquid, and may also be associated with other classes of mixture supply devices.

Referring to the drawing, the specific embodiment of the improved trap shown therein is of a relatively deep type and comprises in general, a main substantially rectangular casing 10 having an inlet pipe 11 connected to an inlet opening in one end wall thereof, and also having a discharge pipe 12 communicating with an outlet opening in the upper portion of the opposite end wall thereof; a substantially upright partition or dam 13 dividing the interior of the casing into inlet and separating chambers 14, 15 respectively, and providing a wier between these chambers; a flow diverting wall 16 extending downwardly into the inlet chamber 14 from a point above the inlet opening to a point somewhat above the bottom of the basin; another flow diverting wall forming a conduit 17 extending upwardly away from the outlet end of the chamber 15 and communicating with the outlet pipe 12; and a removable cover 18 for the main casing 10.

The main casing 10 which may be of any other desired shape than shown, is illustrated as being formed of metal plates, welded together, but may be formed by casting or in any other suitable manner, and this casing preferably has considerable width transversely of the direction of flow of the liquid therethrough, and also preferably has substantial depth from the bottom of the outlet pipe to the bottom of the casing 10. The partition or dam 13 which may be either vertical or inclined, is preferably removably mounted within retaining slots such as grooves 19 formed in the side walls of the casing 10, and this dam is provided with any desired number of superimposed elongated by-pass openings 20 and louvers 21 extending upwardly away from these openings and into the main separating chamber 15. These openings and louvers 21 may be of any desired size or shape and the louvers 21 preferably extend away from the dam 13 in the direction of flow and at an angle of approximately thirty degrees; and the upper edges of the louvers provide auxiliary dams, the crests of which may be disposed at, above or below the tops of the adjacent openings 20.

As previously indicated, the openings 20 and louvers 21 preferably extend substantially across the inlet end of the main separating chamber 15, and any desired number and sizes of openings 20 and louvers 21 may be provided. The lower portions of the chambers 14, 15 may be provided with suitable drainage and clean-out plugs, wherever desirable. The diverting wall 16 may also be mounted for removability in recesses or grooves 22 associated with the opposite side walls of the casing 10, and as previously indicated, this diverting wall forms a hood over the inlet opening at the end of the pipe 11. The liquid discharge conduit 17 may be welded or otherwise attached to or united with the casing 10 and has a lower inclined apron 23, and the conduit extends from a point near the bottom of the main separating basin or chamber 15 to a point above the normal level of the liquid in this chamber, but the top of the conduit 17 is preferably located outwardly away from the main casing 10 so that the vent fixtures will clear the cover 18. The liquid leaving the chamber 15 normally flows beneath the apron 23 and through the conduit 17 to the outlet pipe 12, and pressure or vacuum within the casing 10 is relieved through the vent pipe 24 either directly from the interior of the casing 10, or directly from the conduit 17 and discharge pipe 12 through a riser pipe 25 extending centrally within the vent pipe 24. The vent pipe 24 may also be provided with a T-fitting 26 having a clean-out plug 27 therein, and the escaping gases are conducted from the fitting 26 by a pipe 28.

The cover 18 preferably coacts with the upper edge of the casing 10 through a sealing gasket of suitable material, and is detachably clamped in position by means of wing nuts 29 or the like coacting with studs 30, the latter being pivotally or otherwise associated with lugs 31 formed on the casing 10. It is to be noted that the cover may be removed without interfering with the vent pipe 24 and when the cover 18 has been removed, the chambers 14, 15 are freely accessible for removal of accumulated grease and for cleaning purposes. The removal of the cover 18 does not in any manner affect the normal operation of the trap, and the vent may be inspected and cleaned upon removal of the plug 27. When the cover has been removed, the dam 13 and diverting wall 16 may also be withdrawn from their retaining grooves for purposes of permitting cleaning of the trap.

During normal operation of the improved grease trap, the mixture of liquid and grease is admitted to the inlet chamber 14 from the supply pipe 11, and is immediately diverted downwardly by the wall 16, being caused to simultaneously spread laterally and thereby having its velocity materially reduced. After passing beneath the lower end of the wall 16, the mixture strikes the lower end of the dam 13 and rises gradually and without turbulence, and ultimately flows over the elongated crest of the dam 13 and through the openings 20, into the separating chamber 15. The mixture which passes through the openings 20 strikes the louvers 21 and is also diverted upwardly, but this deflection is produced without violent agitation. During the gradual ascent of the mixture within the chambers 14, 15 some of the grease particles are immediately separated and of these separated particles, some remain and accumulate directly above the dam 13, while other grease particles are carried beyond the dam and gently flow away from the latter into the separating basin 15. These residual grease particles are subsequently separated and float to the top of the basin 15 by virtue of their low specific gravity and their upward direction of flow at low velocity. When large quantities of grease accumulate near the crest of the dam, more liquid passes through the openings 20 and past the louvers 21, but the velocity of flow through the chamber 15 and toward the outlet is maintained substantially uniform. The separated clear liquid gradually advances through the chamber 15, and eventually flows beneath the apron 23 and upwardly through the conduit 17, and is eventually discharged through the delivery pipe 12 at approximately the same level as that of the liquid within the chambers 14, 15. Any pressure created and gases which escape from the bath of liquid within the casing 10 during passage thereof through the chambers 14, 15 will be relieved and escape directly to the vent pipe 24, while gases entrained through the conduit 17 and pressure or vacuum created in the pipe 12 will be released through the riser pipe 25 to the vent pipe 24, and the grease which accumulates within the trap may be periodically withdrawn upon removal of the cover 18. It is to be noted that the separation is effected automatically and continuously, and is moreover efficiently accomplished by virtue of the entire elimination of undesirable disturbances in the flow and by maintenance of substantially uniform low velocity flow which prevails during the entire separation.

From the foregoing description, it will be apparent that the present invention provides a simple and compact grease trap structure which is automatic and highly efficient in normal operation. The formation of the dam 13 is of particular importance because of the fact that excess accumulation of grease within the trap will not undesirably affect the velocity of flow of liquid through the trap; and by maintaining the crest of the dam 13 considerably below the normal level of the liquid in the separating basin, relatively unrestricted flow is assured at all times without introducing undesirable agitation. The flow is thus retained relatively unrestricted at all times, regardless of the thickness of the layer of accumulated grease until the rated capacity of the trap is reached, and this uniformity of flow is maintained without introducing undesirable turbulence of agitation, thereby insuring most efficient removal of the grease from the liquid. The improved vent at the discharge end of the trap also insures prompt escape of all gases, and furthermore obviates danger of undesirable siphonage; and the apron 23 gradually conducts the clear liquid into the conduit 17 without causing turbulency. The improved assemblage may obviously be constructed at relatively low cost and requires little attention after proper installation thereof. The apparatus also meets the various requirements for sanitation and safety, and may be installed in conjunction with standard plumbing fixtures for taking waste liquid from any source of supply. The improved trap is obviously adapted for separation of fluent materials other than grease and water, and the dimensions and shapes of the various parts may be altered to suit different conditions of use or application.

It should be understood that it is not desired to limit this invention to the exact details of construction herein shown and described, for various modifications within the scope of the claims may occur to persons skilled in the art.

I claim:

1. A grease trap comprising, a casing forming a separating chamber, a dam spanning said chamber and having an opening therethrough beneath its crest, said dam having a louvre adjacent said opening extending upwardly away from the dam in the direction of flow of liquid through said opening, and means for maintaining the liquid level in said chamber considerably above the crest of said dam.

2. A grease trap comprising, a casing forming a relatively wide separating chamber, a dam spanning the inlet end of said chamber, said dam having superimposed openings and louvres extending upwardly into said chamber away from the lower portions of said openings, and means for constantly maintaining the liquid level in said chamber considerably above the crest of said dam.

3. A grease trap comprising, a casing forming a separating chamber, a dam at the inlet end of said chamber having a crest disposed considerably beneath the normal liquid level in said chamber and also having elongated openings below said crest, and a deflecting louvre projecting upwardly and away from the lower portion of each of said openings at an oblique angle relative to the plane of the dam.

4. A grease trap comprising, a casing forming a relatively long separating chamber, a dam spanning the inlet end of said chamber and having several openings therethrough beneath its crest, means for maintaining the liquid level in said chamber considerably above the crest of said dam, and a deflecting louver projecting upwardly and away from the lower portion of each of said openings.

5. A grease trap comprising, a casing forming a separating chamber, an upright dam spanning said chamber and having a plurality of openings therethrough beneath its crest, means for maintaining the liquid level in said chamber considerably above the crest of said dam, and a deflecting louver extending upwardly into said chamber away from the lower portion of each of said openings.

6. A grease trap comprising, a casing forming a relatively wide and long separating chamber, a dam at the inlet end of said chamber having its crest disposed considerably below the normal liquid level in said chamber and also having a plurality of elongated openings beneath said crest, and a deflecting louver extending upwardly into said chamber away from the lower portion of each of said openings.

7. A grease trap comprising, a casing forming a relatively wide and long separating chamber, a substantially vertical dam spanning the inlet end of said chamber and having its crest disposed considerably below the normal liquid level in said chamber, said dam having a plurality of horizontally elongated openings therethrough beneath its crest, and a deflecting louver projecting upwardly into said chamber away from the lower edge of each of said openings and at an oblique angle to the plane of the dam.

8. A grease trap comprising, a casing forming a separating chamber, a dam having its crest disposed considerably below the normal liquid level in said chamber and being provided with a laterally elongated through-opening beneath its crest, and a louver adjoining said opening and extending upwardly and away from the dam in the direction of flow of liquid through said opening.

ARTHUR M. McLEOD.